United States Patent
Guinaldo Fernandez et al.

(10) Patent No.: US 9,381,991 B2
(45) Date of Patent: Jul. 5, 2016

(54) HIGHLY INTEGRATED STRUCTURE INCLUDING LEADING AND TRAILING EDGE RIBS FOR AN AIRCRAFT LIFTING SURFACE

(71) Applicant: AIRBUS OPERATIONS S.L., Getafe (Madrid) (ES)

(72) Inventors: Enrique Guinaldo Fernandez, Getafe (ES); Francisco Cruz Dominguez, Getafe (ES); Francisco Javier Honorato Ruiz, Getafe (ES); Paula Más Más, Getafe (ES); Iker Vélez De Mendizábal Alonso, Getafe (ES); Carlos Garcia Nieto, Getafe (ES)

(73) Assignee: Airbus Operations S.L., Madrid (ES)

( * ) Notice: Subject to any disclaimer, the term of this patent is extended or adjusted under 35 U.S.C. 154(b) by 91 days.

(21) Appl. No.: 14/086,424

(22) Filed: Nov. 21, 2013

(65) Prior Publication Data
US 2014/0151506 A1    Jun. 5, 2014

(30) Foreign Application Priority Data
Nov. 22, 2012 (EP) .................................. 12382459

(51) Int. Cl.
| B64C 1/00 | (2006.01) |
|---|---|
| B64C 3/00 | (2006.01) |
| B64C 5/00 | (2006.01) |
| B64C 3/18 | (2006.01) |

(Continued)

(52) U.S. Cl.
CPC .............. *B64C 3/182* (2013.01); *B29C 35/0238* (2013.01); *B29C 70/30* (2013.01); *B29D 99/0014* (2013.01); *B64C 3/185* (2013.01); *B64C 3/187* (2013.01); *B64C 3/20* (2013.01); *B64C 5/02* (2013.01); *B29L 2031/3085* (2013.01); *Y02T 50/433* (2013.01)

(58) Field of Classification Search
CPC .......... B64C 3/18; B64C 3/182; B64C 3/185; B64C 3/187; B64C 3/20; B64C 3/24; B64C 3/26; B64C 3/27; B64C 3/00
See application file for complete search history.

(56) References Cited

U.S. PATENT DOCUMENTS

| 6,190,484 B1 * | 2/2001 | Appa | B29C 70/32 156/169 |
|---|---|---|---|
| 7,631,840 B2 * | 12/2009 | Kallinen | B64C 9/02 244/123.1 |

(Continued)

FOREIGN PATENT DOCUMENTS

| DE | 10 2006 02759 | 12/2007 |
|---|---|---|
| EP | 0 976 650 | 2/2000 |
| GB | 2 362 865 | 12/2001 |

OTHER PUBLICATIONS

European Search Report for EP 12382459.1, dated Apr. 22, 2003, (Hofmann, Udo).

*Primary Examiner* — Christopher P Ellis
*Assistant Examiner* — Richard G Davis
(74) *Attorney, Agent, or Firm* — Nixon & Vanderhye P.C.

(57) ABSTRACT

An aircraft lifting surface with a monolithic main supporting structure of a composite material including an upper skin having at least a part of the upper aerodynamic profile of the leading edge and/or of the trailing edge, a lower skin, a front spar, a rear spar, and leading edge ribs and/or a trailing edge ribs. The main supporting structure allows a weight and cost reduction of aircraft lifting surfaces.

12 Claims, 6 Drawing Sheets

(51) Int. Cl.
*B29C 70/30* (2006.01)
*B64C 3/20* (2006.01)
*B64C 5/02* (2006.01)
*B29C 35/02* (2006.01)
*B29D 99/00* (2010.01)
*B29L 31/30* (2006.01)

(56) References Cited

U.S. PATENT DOCUMENTS

2003/0192990 A1  10/2003  Simpson et al.
2010/0065687 A1* 3/2010  Douglas .................. B64C 3/185
                                                          244/130

* cited by examiner

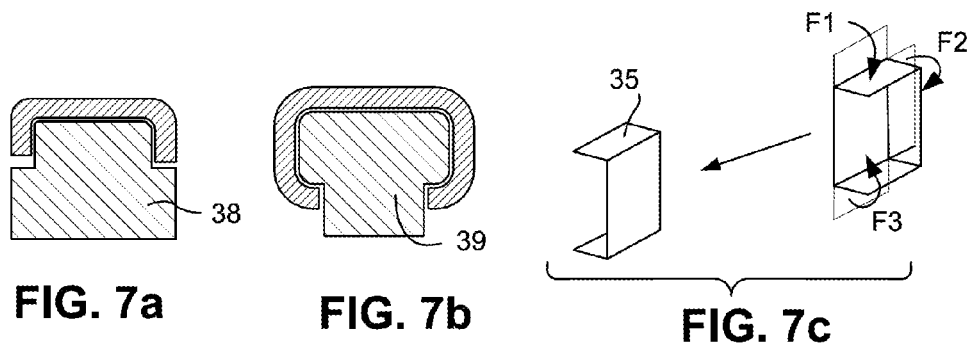
FIG. 7a  FIG. 7b  FIG. 7c
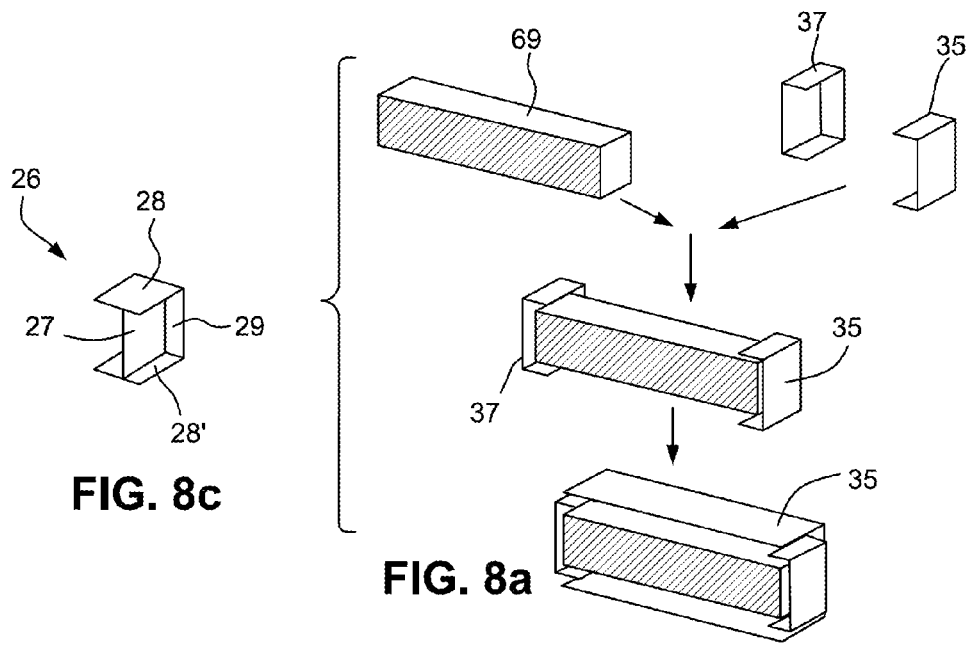
FIG. 8c
FIG. 8a
FIG. 8b

HIGHLY INTEGRATED STRUCTURE INCLUDING LEADING AND TRAILING EDGE RIBS FOR AN AIRCRAFT LIFTING SURFACE

This application claims priority to EP Patent Application No. 12382459.1 filed 22 Nov. 2012, the entire content of which is hereby incorporated by reference.

FIELD OF THE INVENTION

The present invention refers to an aircraft lifting surface and more in particular to the main supporting structure of the lifting surface.

BACKGROUND OF THE INVENTION

An aircraft lifting surface usually comprises a torsion box as its main supporting structure. For example, an aircraft tail plane (horizontal or vertical) is usually structured by a leading edge, a torsion box and a trailing edge with control surfaces (flaps, elevators, rudders, etc.). The torsion box is the main supporting structure responsible for supporting all loads involved (aerodynamic, fuel, dynamics, etc.) and comprises several structural elements.

Composite materials with an organic matrix and continuous fibers, especially CFRP (Carbon Fiber Reinforced Plastic), are nowadays widely used in the aeronautical industry in a great variety of structural elements. Specifically, all the elements which make up the torsion boxes of aircraft tail planes can be manufactured using CFRP.

The design of composite torsion boxes requires combining two perspectives of different nature: that of structural design and that of manufacture.

The traditional approach is the design of the torsion box defining the structural elements that form it (skins, spars, stringers, ribs), the separate manufacture of these elements and their subsequent joint in the assembly plant following schemes similar to those used in the aeronautical industry when only metallic materials were used.

The manufacture can be done using prepreg technology. In a first step, a flat lay-up of composite prepreg plies for each element is prepared. Then a laminated preform of the element with the required shape is obtained by means of a classical hot-forming process, being in some cases substituted by a press-forming process due to high curvatures. After getting the required shape, the laminated preform is cured in a male or female tooling depending on the tolerances required and the overall manufacturing cost. In the case of certain elements comprising sub-components cured separately, such as a rib and a vertical stiffener of it, a second curing cycle is needed for co-bonding said sub-components. Finally, after all the curing cycles, the element contours are trimmed getting the final geometry, and then the element is inspected by an ultrasonic system to assure its quality. The cost of a torsion box manufactured with said method is high because said steps shall be carried out independently for each structural element. Additionally, the cost related to the assembly of the torsion box is also high due to the long length and high complexity of the tasks required to install and to fit all structural elements together. This approach is being followed for manufacturing multi-rib torsion boxes such as that of the horizontal tail plane (HTP) shown in FIGS. 1a, 1b, 1c.

The HTP is structured by leading edges 11, torsion boxes 13 and trailing edges 15 with control surfaces (flaps, elevators, rudders, etc.).

The leading edge is the structure responsible for keeping the aerodynamic surface with the torsion box surface, for supporting the static or cyclic structural loads involved and for protecting the torsion box from bird impacts. It is the part of the HTP surface that first contacts the air and the foremost edge of the airfoil.

A known leading edge 11 comprises, on the one side, several ribs 10, called leading edge ribs, attached to the front spar 18 of the torsion box 13 and, on the other side, an aerodynamic profile 12—commonly known as "nose"—attached to the leading edge ribs 10 and to the flanges of the front spar 18 in order to keep the overall aerodynamic shape of the HTP.

Similarly the trailing edge 15 comprises, on the one side, several ribs, called trailing edge ribs attached to the rear spar 20 of the torsion box 13 and, on the other side, an aerodynamic profile 16 attached to the trailing edge ribs and to the flanges of the rear spar 20 in order to keep the overall aerodynamic shape of the HTP between the torsion box and the control surfaces.

The structural elements of torsion boxes 13 are upper and lower skins 21, 23 stiffened by longitudinal stringers, a front spar 18, a rear spar 20 and transverse ribs 17 attached to the front and rear spars 18, 20 and to the upper and lower skins 21, 23 in order to keep the torsion box shape and reinforce the load introductions areas linked to the HTP structural arrangement in the aircraft and to the actuators for handling the HTP control surfaces.

An alternative approach is to manufacture the whole or a part of a torsion box in an integrated manner for obtaining a monolithic ensemble comprising all or part of the structural elements of the torsion box. In this respect one example is described in WO 2008/132251 for a multi-spar torsion box.

Due to the complexity of aircraft tail planes the aeronautics industry is constantly demanding new proposals and new manufacturing methods that improve efficiency and/or costs of known aircraft tail planes.

The present invention is directed to the attention of that demand.

SUMMARY OF THE INVENTION

It is an object of the present invention to provide a main supporting structure of an aircraft lifting surface of a composite material allowing weight and cost reductions with respect to a comparable structure of known aircraft lifting surfaces.

It is another object of the present invention to provide a method of manufacturing said main supporting structure.

In one aspect, these and another objects are met by a main supporting structure comprising an upper skin, a lower skin, a front spar, a rear spar (and optionally intermediate spars) and a plurality of leading and/or trailing edge ribs; the upper skin including at least a part of the upper aerodynamic profile of the leading edge and/or of the trailing edge; the main supporting structure being a monolithic structure (i.e. without joints). The spars ensure torsional stiffness and overall stability to withstand the required loads and the ribs keep the aerodynamic shape and support movable surfaces (if any).

In embodiments of the invention, the lower skin includes at least a part of the lower aerodynamic profile of the leading edge and/or of the trailing edge.

In embodiments of the invention, the upper and lower skins of the main supporting structure include reinforcing stringers in all the cells delimited by spars.

In another aspect, the above-mentioned objects are met by a method of manufacturing said main supporting structure comprising the following steps: a) providing a set of laminated preforms of a composite material for forming said main supporting structure, each laminated preform being configured to form a part of it; b) arranging said laminated preforms in a curing assembly comprising a first set of tools for forming the closed part of the main supporting structure and a second set of tools for forming the open part of the main supporting structure; c) subjecting the curing assembly to an autoclave cycle to co-cure said laminated preforms; d) demoulding the first set of tools in a spanwise direction and the second set of tools in a chordwise direction. The invention therefore provides a high integrated solution to include leading and/or trailing edge ribs and leading and/or trailing edge aerodynamic profiles in a "one-shot" manufacturing process of a main supporting structure of an aircraft lifting surface of composite material, allowing the reduction of the amount of components and fasteners and consequently the weight and cost.

Other desirable features and advantages of the invention will become apparent from the subsequent detailed description of the invention and the appended claims, in relation with the enclosed drawings.

DESCRIPTION OF THE FIGURES

FIGS. 4b and 5b are schematic cross sections of the monolithic main supporting structure obtained after the curing and the demoulding of the tooling of the curing assembly by, respectively, the planes A-A and B-B of FIG. 3a.

FIGS. 6a and 6b are, respectively, schematic cross sections of another embodiment of the curing assembly of said main supporting structure and of the monolithic main supporting structure obtained after the curing and the demoulding of the tooling of the curing assembly by, respectively, the planes A-A and B-B of FIG. 3a.

FIGS. 7a and 7b are schematic cross sections of the tooling used to form laminated preforms having a C and a double C shape.

FIG. 7c is a sketch of the process for obtaining a rib laminated preform.

FIG. 8a is a diagram illustrating the arrangement of the preforms of one of the modules to be integrated in the rear part of the main supporting structure, FIG. 8b is a schematic perspective view of the set of said modules (assuming that they have the same dimensions) and FIG. 8c is a schematic perspective view of the rib resulting from the integration of two rib laminated preforms.

DETAILED DESCRIPTION OF THE INVENTION

In the following detailed description we would refer to the main supporting structure of an HTP but the invention is applicable to the main supporting structure of any lifting surface of an aircraft.

Figure 1A:
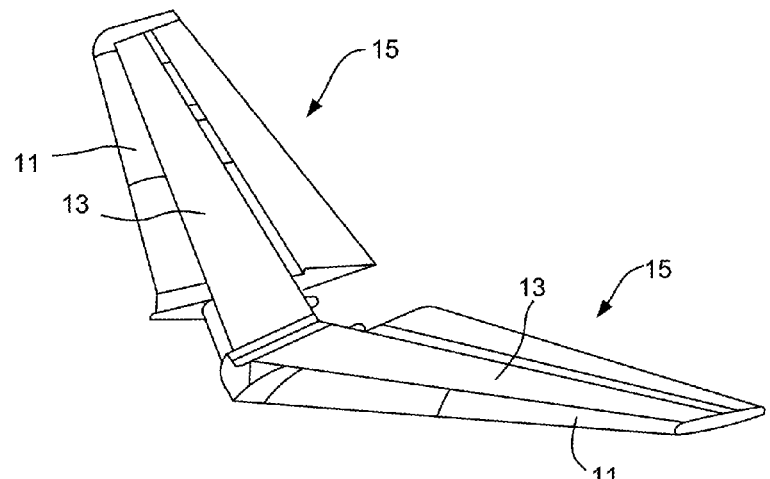
FIG. 1a is a perspective view of a known horizontal tail plane showing the torsion boxes, the leading edges and the trailing edges with control surfaces.
Figure 1B:
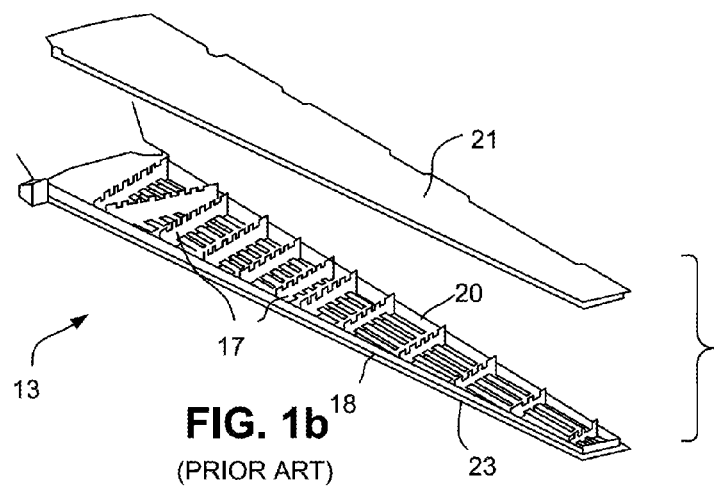
FIG. 1b is a perspective view of a known torsion box, where the upper skin has been moved upwards to improve the visibility inside the box.
Figure 1C:
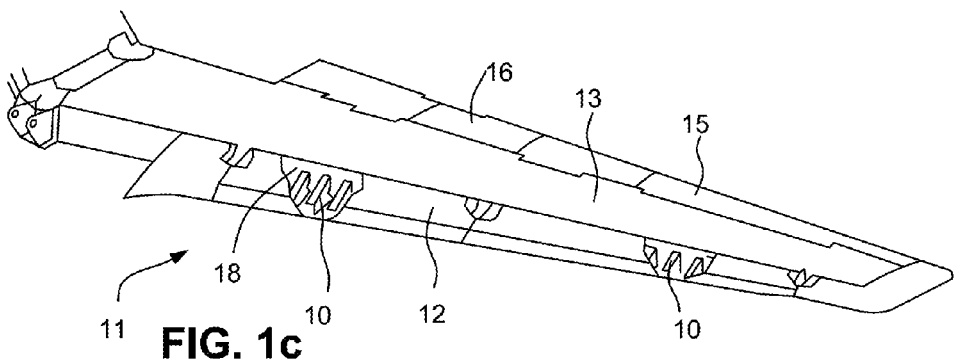
FIG. 1c is perspective view of one side of the horizontal tail plane surface of FIG. 1a with cutaways to improve the visibility of the leading edge structure showing the leading edge ribs and the leading edge profiles.
Figure 2:
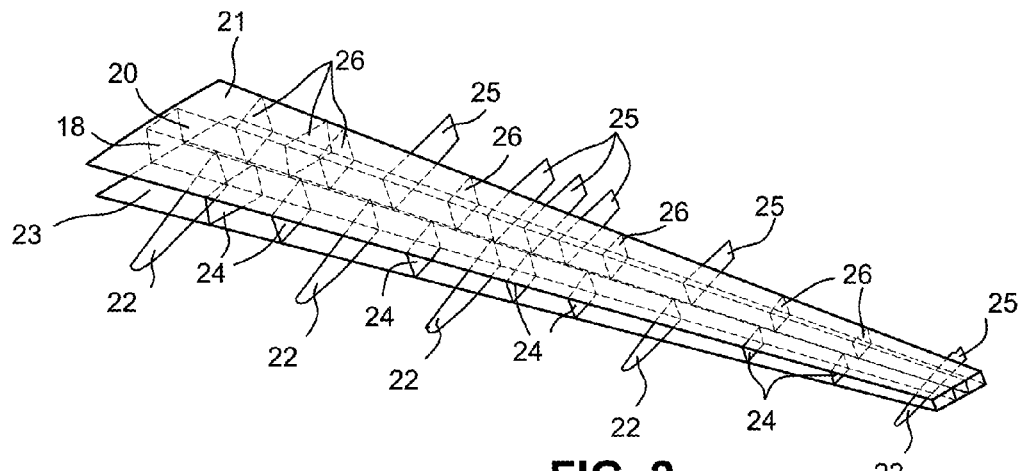
FIG. 2 is a schematic perspective view of an embodiment of a main supporting structure according to the present invention comprising first and second leading edge ribs and first and second trailing edge ribs.

FIG. 2 shows a monolithic main supporting structure 14 of an HTP according to an embodiment of the invention comprising the following structural elements:

A front spar 18 and a rear spar 20.

An upper skin 21 and a lower skin 23 including a part of the aerodynamic profiles of the leading edge 11 and the trailing edge 15.

First leading edge ribs 22 extended inside the leading edge 11 and second leading edge ribs 24 extended inside a region of the leading edge 11 covered by the upper skin 21 and the lower skin 23.

First trailing edge ribs 25 extended inside the trailing edge 15 and second trailing edge ribs 26 extended inside a region of the trailing edge 15 covered by the upper skin 21 and the lower skin 23.

Consequently the main supporting structure 14 comprises the torsion box of known HTP plus part of the leading edge and of the trailing edge.

This configuration, which is very advantageous from a manufacturing standpoint, addresses the specific loading issues of the front and rear parts of the torsion box which occur in many of the typical HTP architectures.

Obviously the number and location of leading and trailing edge ribs depends on the specific architecture of the HTP.

Figure 3A:
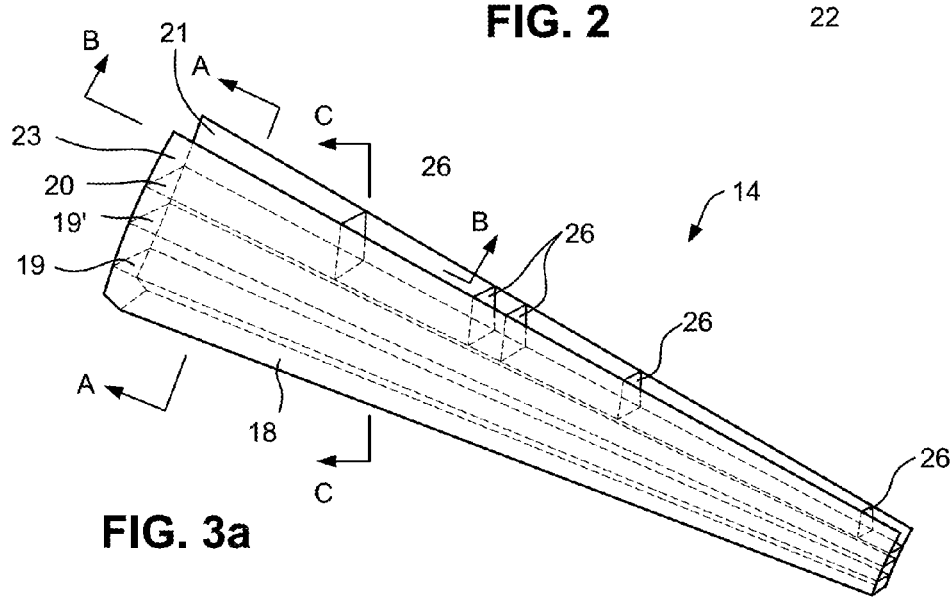
FIG. 3a is a schematic perspective view of an embodiment of a main supporting structure according to the present invention comprising second trailing edge ribs.
Figure 3B:
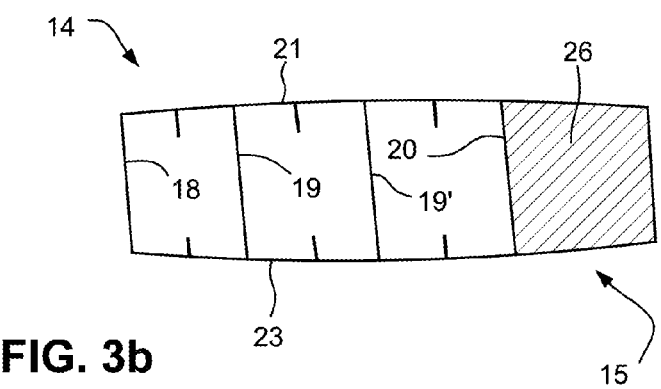
FIG. 3b is a schematic cross section of FIG. 3a by plan C-C.

Other embodiments of a monolithic main supporting structure 14 of an HTP according to the invention comprise different configurations of its front and rear sides including or not including all or part of the above-mentioned leading and trailing edge ribs, and including or not including parts of the aerodynamic profile of the leading edge 11 and/or of the trailing edge 15. One of them is shown in FIGS. 3a and 3b and comprises the following structural elements:

A front spar 18, a rear spar 20 and intermediate spars 19, 19'.

Several trailing edge ribs 26 including both structural ribs and bearing ribs (for example the ribs which support the elevator hinge line).

An upper skin 21 and a lower skin 23 including a part of the aerodynamic profile of the trailing edge 15 covering the trailing edge ribs 26.

Figure 12:
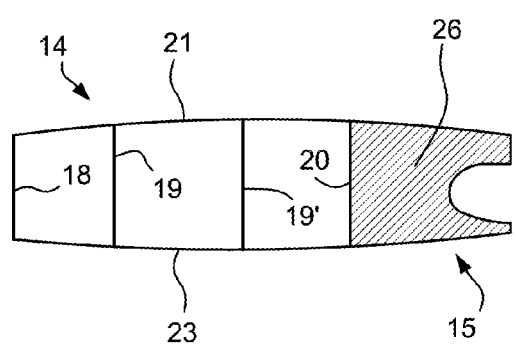
FIG. 12 is a schematic cross section of an embodiment of a main supporting structure according to the invention having trailing edge ribs which are covered by its upper skin and are not covered by its lower skin.
Figure 13:
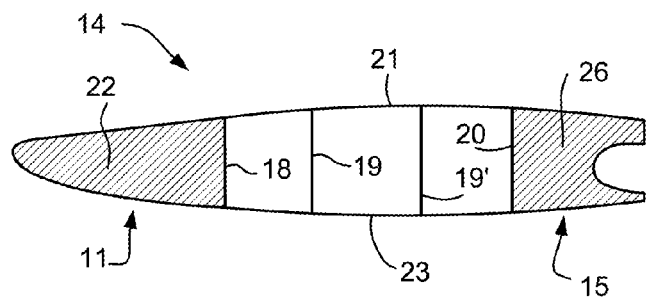
FIG. 13 is a schematic cross section of a main supporting structure according to the invention having leading and trailing edge ribs which are covered by its upper skin and are not covered by its lower skin.

Other embodiments of the main supporting structure 14 with different configurations of the upper and lower skin are shown in FIGS. 12 and 13.

FIG. 12 show an embodiment where only the upper skin 21 covers the trailing edge ribs 26.

FIG. 13 shows an embodiment having leading edge ribs 22 and trailing edge ribs 26 where only the upper skin 21 covers the trailing edge ribs 26 and part of the leading edge ribs 22.

A method for manufacturing the monolithic main supporting structure 14 shown in FIGS. 3a and 3b according to the invention is based on prepreg technology and comprises the following steps:

Preparing a set of laminated preforms that will form the monolithic main supporting structure 14, laying-up for each of them a flat lay-up of composite prepreg plies and subjecting the flat lay-up to a hot-forming process on a suitable tool to give it the desired shape or performing the desired lay-up over a surface with the desired shape. The term "laminated preform" as used in this specification designates a composite that is intended to be integrated with other elements in the manufacturing process of the product to which it belongs.

Arranging together all the laminated preforms on a curing assembly 40 with a suitable tooling and subjecting the curing assembly 40 to an autoclave cycle to co-cure the laminated preforms.

Demoulding the tooling.

Trimming and inspecting the assembly.

Figure 4A:
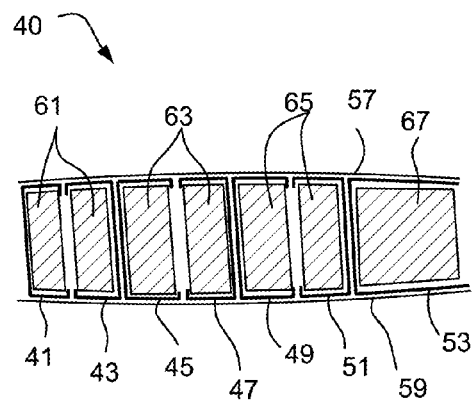
FIGS. 4a and 5a are schematic cross sections of an embodiment of the curing assembly of the main supporting structure of FIG. 3a by, respectively, the planes A-A and B-B.
Figure 4B:
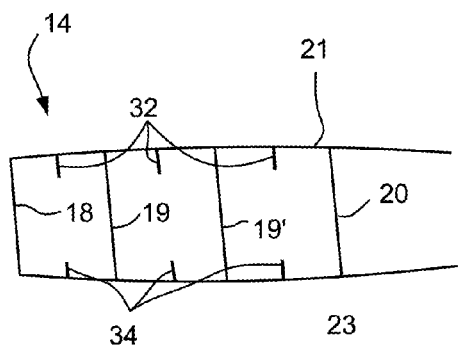
Figure 5A:
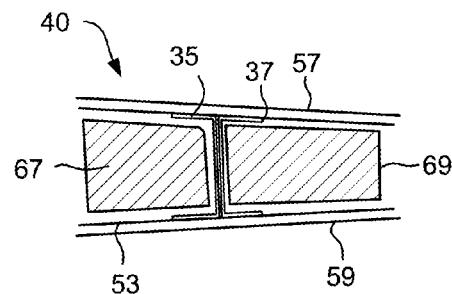
Figure 5B:
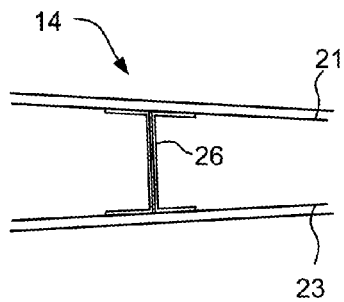

The laminated preforms used to manufacture the monolithic main supporting structure 14 of FIGS. 4b and 5b, comprising upper and lower skins 21, 23, with reinforcing stringers 32, 34 in all the closed cells, are the following (see FIGS. 4a, 5a):

Laminated preforms 41, 43, 45, 47, 49, 51 having a double C-shaped transversal section to form the inner part of the monolithic main supporting structure 14 between the front spar 18 and the rear spar 20.

Figure 9A:
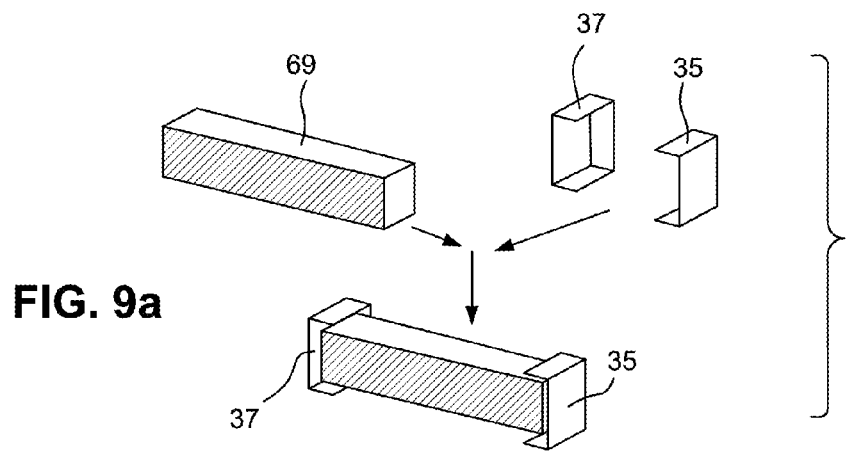
FIG. 9a is a diagram illustrating the arrangement of the preforms of one of the modules to be integrated in the rear part of the torsion box in another embodiment of the invention and FIG. 9b is a schematic perspective view of all these modules.
Figure 9B:
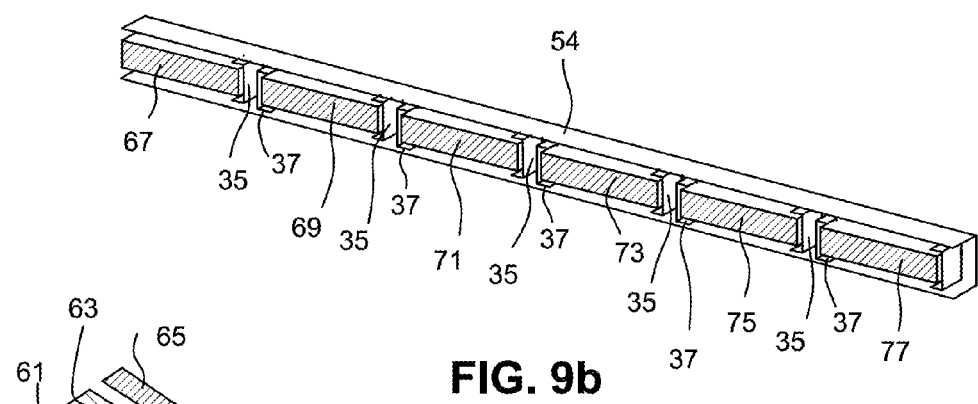

Laminated preforms 53 having a C-shaped transversal section to form the inner part of the monolithic main supporting structure 14 between the rear spar 20 and the rear end together with pairs of laminated preforms 35, 37 having a C-shaped transversal section and a lateral wall in their inner ends to form the trailing edge ribs 26 (see also FIGS. 8a, 8b and 8c). In the embodiment shown in FIGS. 9a and 9b a single laminate preform 54 having a C-shaped transversal section is used instead of said laminated preforms 53.

Laminated preforms 57, 59 with the shape of upper and lower skins 21, 23 to form its outer part.

Figure 6A:
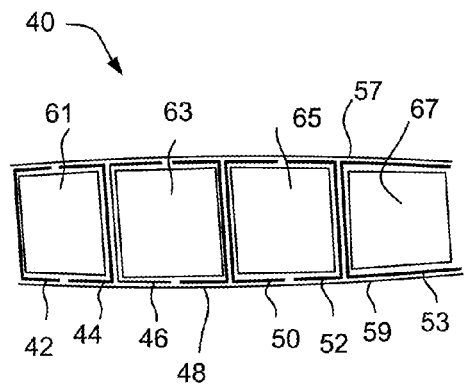
Figure 6B:
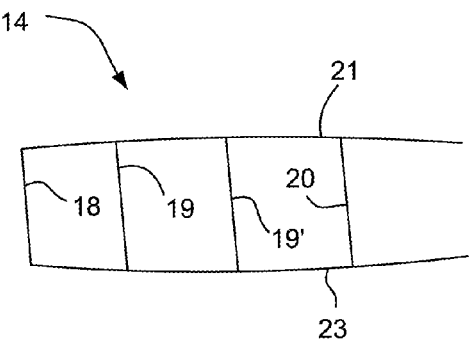

FIG. 6b shows another embodiment of the monolithic main supporting structure 14 comprising upper and lower skins 21, 23 without reinforcing stringers. FIG. 6a shows the set of laminated preforms for this embodiment comprising laminated preforms 42, 44, 46, 48, 50, 52 having a C-shaped transversal section instead of the laminated preforms 41, 43, 45, 47, 49, 51 of the embodiment shown in FIG. 4a.

The double C-shaped laminated preforms 41, 43, 45, 47, 49, 51, configured by a web, two primary flanges and two secondary flanges, are formed (see FIG. 7b) bending the ends of a flat lay-up on a tooling 39 in two steps to get the primary flanges and the secondary flanges. The latter are those that form the reinforcing stringers 32, 34 of upper and lower skins 21, 23 (see FIG. 4b).

The C-shaped laminated preforms 53, 54, 42, 44, 46, 48, 50, 52 configured by a web and two flanges, are formed (see FIG. 7a) bending the ends of a flat lay-up on a tooling 38 to get the flanges.

The rib preforms 35, 37 configured by a web, two flanges and a lateral wall are formed bending a flat laminate. FIG. 7c shows the bending operations—indicated by arrows F1, F2, F3—needed to form the flanges and the lateral wall of a rib laminated preform 35 (the tooling is not shown).

FIG. 8c shows the rib 26 resulting from the integration of preforms 35, 37 which is configured by a web 27, two flanges 28, 28' and a lateral wall 29 having the same height as the web 27 and the same width as the flanges 28, 28'.

The thickness and composite material of each laminated preform are defined according to the structural needs of the structural elements of the main supporting structure 14.

As illustrated in FIGS. 4a, 5a and 6a said preforms are arranged on a tooling (see also FIG. 10) forming a curing assembly 40 which will be subjected to an autoclave cycle to get the main supporting structure 14.

Said tooling comprises the following elements:

A tool 61 extended on the space foreseen to be delimited by the front spar 18 and the intermediate spar 19.

A tool 63 extended on the space foreseen to be delimited by the intermediate spars 19, 19'.

A tool 65 extended along the space foreseen to be delimited between the intermediate spar 19' and the rear spar 20.

Tools 67, 69, 71, 73, 75, 77 extended on the spaces foreseen to be delimited by ribs 26. FIG. 8a shows particularly the assembly of the module corresponding to the tool 69 with the rib preforms 37, 35 and the C-shaped preform 53.

Figure 10:
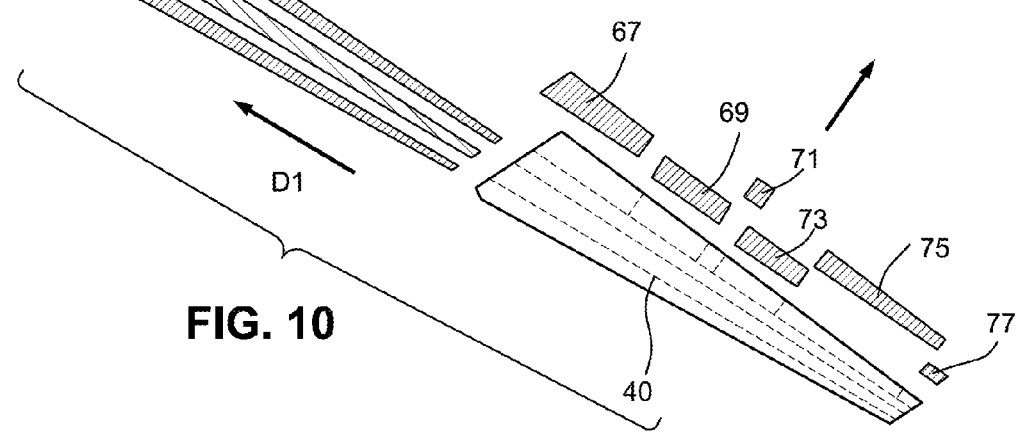
FIG. 10 is a schematic view of the demoulding process of the curing assembly.

As illustrated particularly in FIG. 10, tools 61, 63, 65 are demoulded in the spanwise direction D1 of the curing assembly 40 and tools 67, 69, 71, 73, 75, 77 are demoulded in the chordwise direction D2 of the curing assembly 40.

Figure 11A:
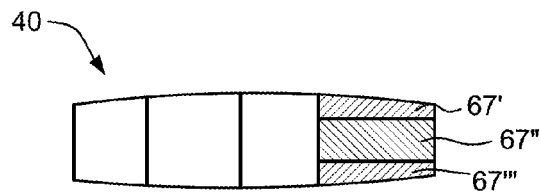
FIGS. 11a, 11b and 11c are schematic representations of the demoulding process of the tooling of the open part of the monolithic ensemble in a particular embodiment of said tooling.
Figure 11B:
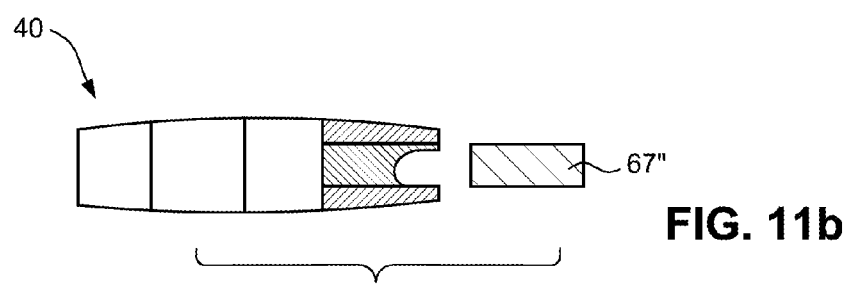
Figure 11C:
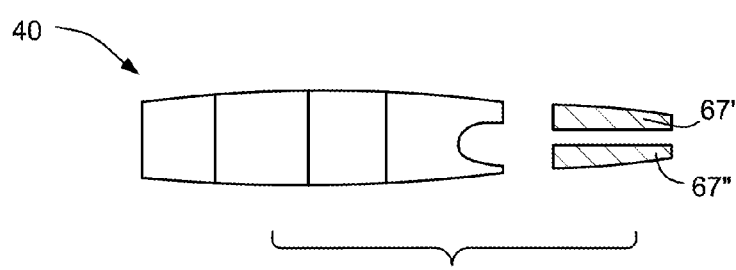

In the case of a main supporting structure 14 having upper and lower skins 21, 23 with substantial curvature may be desirable to divide the tools 67, 69, 71, 73, 75, 77 into parts to facilitate the demoulding process. See FIGS. 11a, 11b, 11c in which the tool 67 has been divided into three parts 67', 67'', 67''' for demoulding the central part 67'' in the chordwise direction in the first place and the tools 67', 67''' in the second place, separating them from the upper and lower skins 21, 23 in a vertical direction in a first step and removing them in a chordwise direction in a second step.

In another embodiment of the invention for a main supporting structure 14 having upper and skins 21, 23 with substantial curvature, the part of the lower skin 23 covering the trailing edge ribs 26 is joined to the rest of the lower skin 23 in an articulated manner (for example by means of hinges) so that the tools 67, 69, 71, 73, 75, 77 can be demoulded in a vertical direction.

After completing the demoulding process, the monolithic main supporting structure 14 is located in the trimming machine in order to get the final geometry and is subjected to an automatic ultrasonic inspection for verifying that it does has not have any defects.

These manufacturing methods are applicable mutatis mutandi to other embodiments of the main supporting structure according to the invention.

Although the present invention has been described in connection with various embodiments, it will be appreciated from the specification that various combinations of elements, variations or improvements therein may be made, and are within the scope of the invention.

The invention claimed is:

1. An aircraft lifting surface comprising:
   a leading edge section and a trailing edge section, and
   a main supporting structure between the leading edge section and the trailing edge section,
   the main supporting structure including an upper skin, a lower skin, a front spar, a rear spar each formed of a composite material, and a plurality of leading edge ribs and/or a plurality of trailing edge ribs each formed of a composite material;
   wherein the upper skin includes a part of an upper aerodynamic profile of the leading edge and/or of the trailing edge such that portions of the leading edge ribs and/or the trailing edge ribs extend beyond the upper skin and into the leading edge section or the trailing edge section; and
   the main supporting structure is a monolithic structure.

2. The aircraft lifting surface according to claim 1, wherein the lower skin includes at least a part of a lower aerodynamic profile of the leading edge and/or of the trailing edge such that portions of the leading edge ribs and/or the trailing edge ribs extend beyond the upper skin and into the leading edge section or the trailing edge section.

3. The aircraft lifting surface according to claim 2, wherein the at least part of the lower aerodynamic profile of the leading edge and/or of the trailing edge is joined to the lower skin by hinges.

4. The aircraft lifting surface according to claim 1, wherein:
   said leading edge ribs comprise one or more first leading edge ribs extending inside the leading edge section and only partially covered by the upper skin and the lower skin, and/or one or more second leading edge ribs extending inside a region of the leading edge section such that the second leading edge ribs are entirely covered by the upper skin and the lower skin;
   said trailing edge ribs comprise one or more first trailing edge ribs extending inside the trailing edge and only partially covered by the upper skin and the lower skin, and/or one or more second trailing edge ribs extending inside a region of the trailing edge section such that the second trailing edge ribs are entirely covered by the upper skin and the lower skin.

5. The aircraft lifting surface according to claim 4, wherein the first leading edge ribs, the first trailing edge ribs, the second leading edge ribs and the second trailing edge ribs are configured by a web, flanges and a lateral wall having ends joined to the front or the rear spar; the lateral wall having a height equal to a height of the web and a width equal to a width of the flanges.

6. The aircraft lifting surface according to claim 1, wherein the main supporting structure comprises one or more intermediate spars.

7. The aircraft lifting surface according to claim 1, wherein the upper skin and the lower skin comprise at least one longitudinal stringer in at least one of a cell of the main supporting structure, wherein the cell is delimited by the front and rear spars.

8. An aircraft lifting surface comprising:
   a leading edge and a trailing edge, and
   a monolithic support structure formed of a composite material configured to be attached to the leading edge and the trailing edge, wherein the monolithic support structure includes an upper skin, a lower skin, a front spar, a rear spar, leading edge ribs and trailing edge ribs,
   wherein the upper skin of the monolithic support structure includes at least a part of an upper aerodynamic profile of the leading edge and/or of the trailing edge and portions of at least some of the leading edge ribs or the trailing edge ribs extend beyond the upper skin of the monolithic support structure.

9. A monolithic support structure for an aircraft lifting surface comprising:
   a front spar, a rear spar and ribs each formed of a composite material, wherein the ribs include at least one group of a first group of ribs extending from the front spar towards a leading edge of the aircraft lifting surface or a second group of ribs extending from the rear spar towards a trailing edge of the aircraft lifting surface;
   a composite material skin forming upper and lower surfaces of the monolithic support structure and extending between the front spar and the rear spar along a span of the support structure,
   wherein the skin further extends partially over the first group of ribs from the front spar towards the leading edge or extends partially over the second group of ribs from the rear spar towards the trailing edge, and wherein a portion of the first group of ribs or the second group of ribs extends beyond and are not covered by the skin.

10. The monolithic support structure of claim 9 the skin extends over the first or second groups of ribs an entirety of the span of the monolithic support structure.

11. The monolithic support structure of claim 9 wherein the skin include an upper skin extending partially over the first group of ribs from the front spar towards the leading edge or extending partially over the second group of ribs from the rear spar towards the trailing edge.

12. The monolithic support structure of claim 9 wherein the skin include a lower skin extending partially over the first group of ribs from the front spar towards the leading edge or extending partially over the second group of ribs from the rear spar towards the trailing edge.

* * * * *